United States Patent
Chen

(10) Patent No.: US 7,280,254 B2
(45) Date of Patent: Oct. 9, 2007

(54) METHOD FOR MAINTAINING UNIFORM SPATIAL FREQUENCY OVER A DATAGLYPH BLOCK

(75) Inventor: Jindong Chen, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 884 days.

(21) Appl. No.: 10/373,972

(22) Filed: Feb. 25, 2003

(65) Prior Publication Data

US 2004/0165219 A1  Aug. 26, 2004

(51) Int. Cl.
*H04N 1/409* (2006.01)
*H04N 1/405* (2006.01)
*G06T 5/00* (2006.01)
*G06K 15/00* (2006.01)

(52) U.S. Cl. .................... 358/3.26; 358/3.28; 358/3.06

(58) Field of Classification Search ............... 358/3.26, 358/3.28, 3.06, 1.1, 1.9, 470; 382/275; 235/456, 235/494

See application file for complete search history.

(56) References Cited

U.S. PATENT DOCUMENTS

| 5,091,966 | A | | 2/1992 | Bloomberg et al. ........... 382/21 |
| 5,128,525 | A | * | 7/1992 | Stearns et al. .............. 235/454 |
| 5,315,098 | A | | 5/1994 | Tow ........................... 235/494 |
| 5,710,636 | A | | 1/1998 | Curry ......................... 358/298 |
| 5,862,255 | A | * | 1/1999 | Davies et al. ................ 382/183 |
| 6,076,738 | A | * | 6/2000 | Bloomberg et al. ......... 235/494 |
| 6,641,053 | B1 | * | 11/2003 | Breidenbach et al. ....... 235/494 |

* cited by examiner

*Primary Examiner*—Thomas D. Lee
(74) *Attorney, Agent, or Firm*—Patrick J. S. Inouye; Krista A. Wittman; Krystyna Szul

(57) ABSTRACT

A method for reducing the obtrusiveness of artifacts appearing in a glyph shape code image space includes encoding digital data values as a glyph shape code, such that the shape code is composed of glyphs having shapes that encode digital data values. Each distinct data value that is encoded is represented by the shape of a glyph, and these glyphs are spatially distributed in a bitmap image space. The bitmap image space is analyzed to determine the presence of artifacts within the bitmap image space, and a raster image is generated in which at least a single dot is placed within at least one of the artifacts in the image space.

22 Claims, 14 Drawing Sheets

Table 1. Dispersed Dots

Table 2. Clustered Dots

FIG. 14

METHOD FOR MAINTAINING UNIFORM SPATIAL FREQUENCY OVER A DATAGLYPH BLOCK

INCORPORATION BY REFERENCE

The following U.S. patents are fully incorporated herein by reference: U.S. Pat. No. 5,091,966 ("Adaptive Scaling for Decoding Spatially Periodic Self-Clocking Glyph Shape Codes"); U.S. Pat. No. 5,315,098 ("Methods and Means for Embedding Machine Readable Digital Data in Halftone Images"); and U.S. Pat. No. 5,710,636 ("Method and Apparatus for Generating Halftone Images Having Human Readable Patterns Formed Therein").

BACKGROUND OF THE INVENTION

This invention relates generally to devices and methods for embedding machine-readable digital data as self-clocking glyph shape codes, and, more particularly, to devices and methods for producing glyph shape codes such that the embedded digital data is unobtrusive.

The functional utility of plain paper and other types of hardcopy documents can be enhanced significantly if the human readable information that they normally convey is supplemented by adding appropriate machine readable digital data to them. Scanners can be employed for recovering this machine readable data, so the data can be employed for various purposes during the electronic processing of such documents and their human readable contents by electronic document processing systems, such as electronic copiers, text and graphic image processing systems, facsimile systems, electronic mail systems, electronic file systems, and document and character recognition equipment.

As is known, machine readable digital data can be recorded by writing two dimensional marks on a recording medium in accordance with a pattern which encodes the data either by the presence or absence of marks at a sequence of spatial locations or by the presence or absence of mark related transitions at such locations. The bar-like codes which others have proposed for recording digital data on paper utilize that type of encoding. See U.S. Pat. No. 4,692,603 titled "Optical Reader for Printed Bit-Encoded Data and Method of Reading Same," U.S. Pat. No. 4,728,783 and U.S. Pat. No. 4,754,127 on "Method and Apparatus for Transforming Digitally Encoded Data into Printed Data Strips," and U.S. Pat. No. 4,782,221 on "Printed Data Strip Including Bit-Encoded Information and Scanner Contrast." Another interesting approach is to encode machine-readable digital data in the shapes of the marks of "glyphs" that are written on the recordings medium. Such shape codes are disclosed in U.S. Pat. No. 5,091,966 to Bloomberg et al., the disclosure of which is incorporated herein by reference.

Glyph shape codes have the advantage that they can be designed to have a relatively uniform appearance. For instance, a simple glyph shape code suitably is composed of small slash-like marks that are tilted to the right or left at, say, ±45 degrees for encoding 1's and 0's, respectively. However, in some situations the more or less uniformly gray appearance of such a code may be aesthetically objectionable, and may cause the tone of the image to change upon tilting of the glyph codes.

It is possible to form images themselves utilizing the glyph marks of a data block as the cells making up the image. This is done by the known method of halftone rendering of the glyph marks, for example as described in U.S. Pat. No. 5,315,098 (Tow) and U.S. Pat. No. 5,710,636 (Curry), both incorporated herein by reference in their entireties. In forming such an image, the gray level, or grayscale, values of the glyph marks is varied, for example by making the glyph symbols (for example "/" and "\") thicker/darker or thinner/lighter as needed. The overall image formed contains the machine-readable embedded data therein, but again the individual glyph marks are not obtrusive to the unaided human eye.

However, a regular glyph block, especially in a glyph tone image, shows an apparent artifact if four neighboring cells form an empty diamond shape. As the size of a diamond is twice as large as the average spatial frequency of the whole block, it becomes visually noticeable in the image.

SUMMARY OF THE INVENTION

Briefly stated, and in accordance with one aspect of the present invention, a method is disclosed for reducing the obtrusiveness of artifacts appearing in a glyph shape code image space. The method includes encoding digital data values as a glyph shape code, such that the shape code is composed of glyphs having shapes that encode digital data values. Each distinct data value that is encoded is represented by the shape of a glyph, and these glyphs are spatially distributed in a bitmap image space. The bitmap image space is analyzed to determine the presence of artifacts within the bitmap image space, and a raster image is generated in which at least a single dot is placed within at least one of the artifacts in the image space.

In accordance with another aspect of the present invention, a system is disclosed for reducing the obtrusiveness of artifacts appearing in a glyph shape code image space. The system includes an input device for providing a bitmap image and a processor for executing control instructions and image editing and manipulation instructions. Within the processor is an encoder for encoding digital data values as a glyph shape code, in which the code is composed of glyphs having shapes that encode digital data values, such that each distinct data value that is encoded is represented by the shape of a respective glyph. The processor also analyzes the bitmap image space to determine the presence of artifacts within the image. The image is then manipulated to create a bitmapped image file in which at least one dot is placed within at least one of the artifacts. The system also includes a main memory, a mass memory and a printer for mapping the digital values of the bitmapped image file into the spatially corresponding pixels of the image it prints on a recording medium.

In accordance with yet another aspect of the present invention, an article of manufacture is disclosed for performing a method for reducing the obtrusiveness of artifacts appearing in a glyph shape code image space. The article of manufacture includes a computer usable medium in which computer readable program code is embodied. When the program code is executed by a computer, the computer encodes digital data values as a glyph shape code, such that the shape code is composed of glyphs having shapes that encode digital data values. Each distinct data value that is encoded is represented by the shape of a glyph, and these glyphs are spatially distributed in a bitmap image space. The bitmap image space is analyzed to determine the presence of artifacts within the bitmap image space, and a raster image is generated in which at least a single dot is placed within at least one of the artifacts in the image space.

BRIEF DESCRIPTION OF THE DRAWINGS

The foregoing and other features of the instant invention will be apparent and easily understood from a further reading of the specification, claims and by reference to the accompanying drawings in which:

Figure 14:
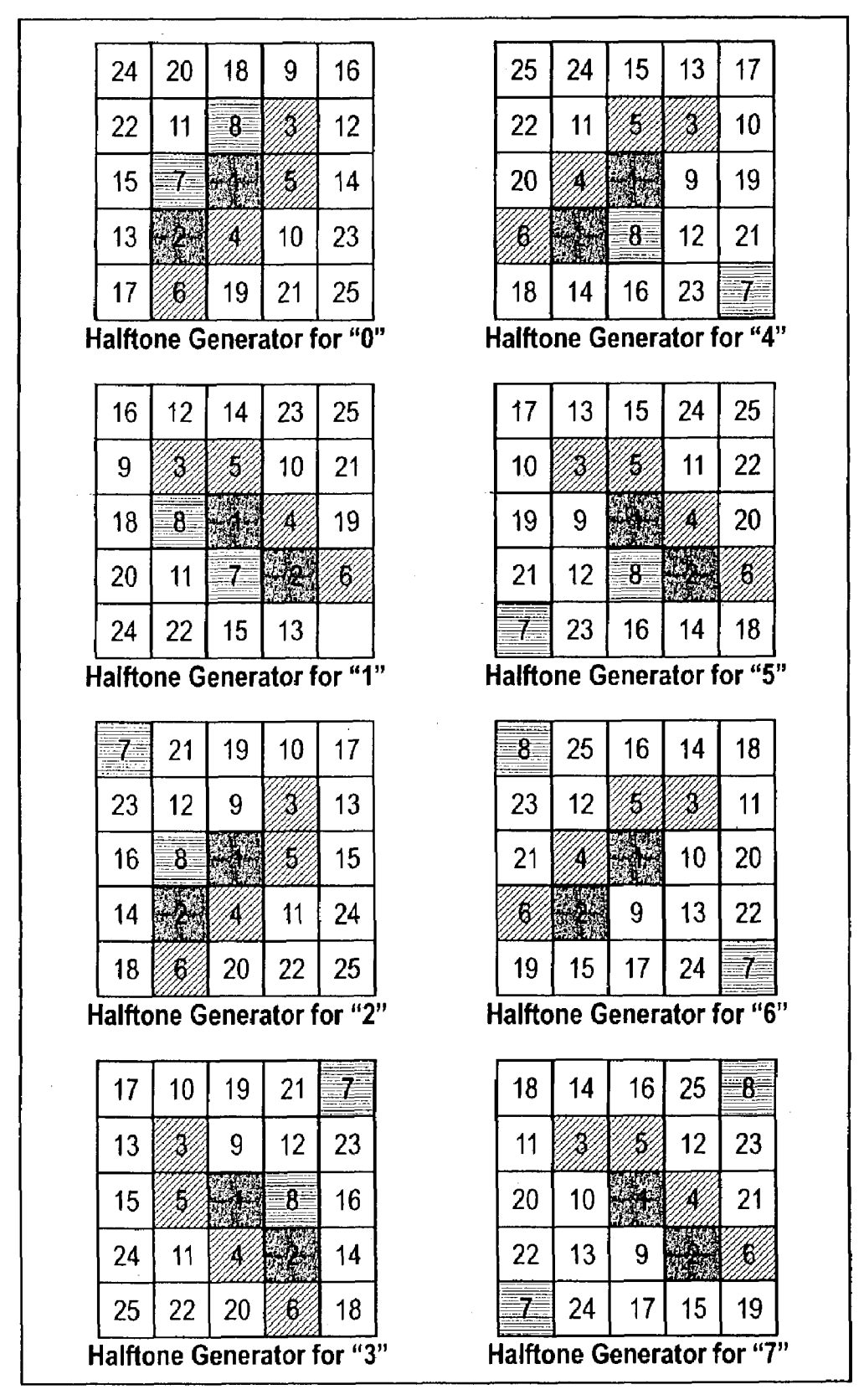

FIG. 14 illustrates sample embodiments of halftone generators utilized as indicated in the flowchart of FIG. 13.

DETAILED DESCRIPTION OF THE INVENTION

While the invention is described in some detail hereinbelow with specific reference to certain embodiments, it is to be understood that there is no intent to limit it to those embodiments. On the contrary, the aim is to cover all alternatives, modifications, and equivalents falling within the spirit and scope of the invention as defined by the appended claims.

Figure 1:
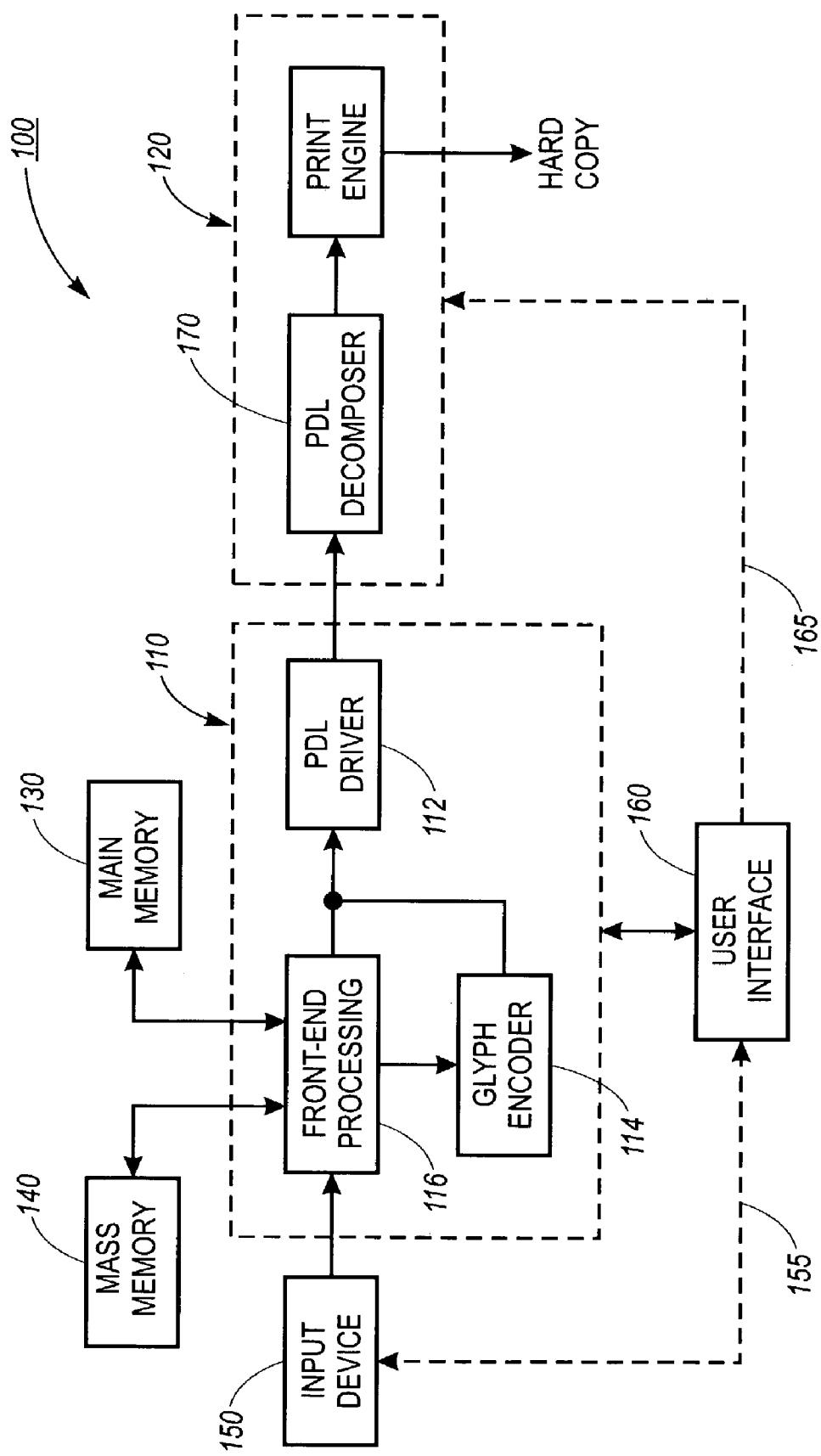
FIG. 1 is a functional block diagram of an electronic document processing system for carrying out and taking advantage of the various aspects of the present invention.

Turning now to FIG. 1, electronic document processing system 100 illustrates a typical environment for embodiments disclosed herein. In keeping with standard practices, the document processing system 100 comprises a digital processor 110 having a main memory 130 and a mass memory 140, an input device 150 for providing digital representations of selected hardcopy documents into the processor 110, and a printer 120 for printing hardcopy renderings of selected ones of the files that are listed on the file directory (not shown) of the processor 110. Furthermore, the system may include a user interface 160 for enabling a user to interact with the processor 110, the input device 150, and the printer 120.

As will be understood, the user interface 160 collectively represents the input devices through which the user enters control instructions for the input device 150 and for the printer 120, as well as the image editing and manipulation instructions for the processor 110. Additionally, the interface 160 represents the output devices through which the user receives feedback with respect to the actions that are taken in response to the instructions that are entered by the user or otherwise, such as under program control. For example, the user interface 160 generally includes a keyboard or the like for entering use instructions, a monitor for giving the user a view of the process that is being performed by the processor 110, and a cursor controller for enabling the user to move a cursor for making selections from and/or for entering data into a process that is being displayed by the monitor (none of these conventional components is shown).

The illustrated document processing system 100 is centralized, so it has been simplified by assuming that all control instructions and all image editing and manipulation instructions are executed by the processor 110 under program control. In practice, however, the execution of these instructions may be handled by several different processors, some or all of which may have their own main memory and even their own mass memory. Likewise, either or both of the input device 150 and the printer 120 may have its own user interface, as indicated by the dashed lines 155 and 165, respectively. Indeed, it will be evident that the document processing system 100 could be reconfigured to have a distributed architecture to operate with a remote input scanner and/or a remote printer (not shown). Data could be transferred from and to such remote scanner and printer terminals via dedicated communication links or switched communication networks (also not shown).

The printer 120, on the other hand, generally is a so-called bitmap printer for mapping the digital values of a bitmapped image file into the spatially corresponding pixels of the image it prints on a suitable recording medium, such as plain paper. The processor 110 may be configured to manipulate and store bitmapped image files and to transfer such files on demand to the printer 120. Alternatively, however, the processor 110 may include a PDL (page description language) driver 112 for transferring to the printer 120 PDL descriptions of the electronic document files that are selected for printing. Thus, the printer 120 is illustrated as having a PDL decomposer 170 for decomposing such PDL descriptions to produce corresponding bitmapped image files. Still other types of printers and processor/printer interfaces will suggest themselves, but it will be assumed for purposes of the following discussion that the printer 120 is a bitmap printer that receives PDL files from the processor 110.

As will be seen, there is a glyph encoder 114 for causing the printer 120 to print machine-readable digital data glyphs on the recording medium, either alone or in juxtaposition with human readable information. For certain applications the glyph encoder 114 may be co-located with the processor 110 for inserting glyph encodings into the electronic document files prior to the translation of such files into PDL descriptions. But, for other applications, it may be necessary or desirable to have the glyph encoder 114 insert the glyph encodings into the raster formatted bitmapped image file that is provided for the printer 120. PDL descriptions of glyph shape encoded may take several different forms, including encapsulated bitmap representations of the code in which such data is encoded, font descriptions and layout locations for bitmap representations of the individual encoded glyph shapes (assuming that such bitmaps exist on or are down loadable to the font directory of the printer 120), and bit-by-bit descriptions of the bitmaps for the encoded glyph shapes.

Figure 2:
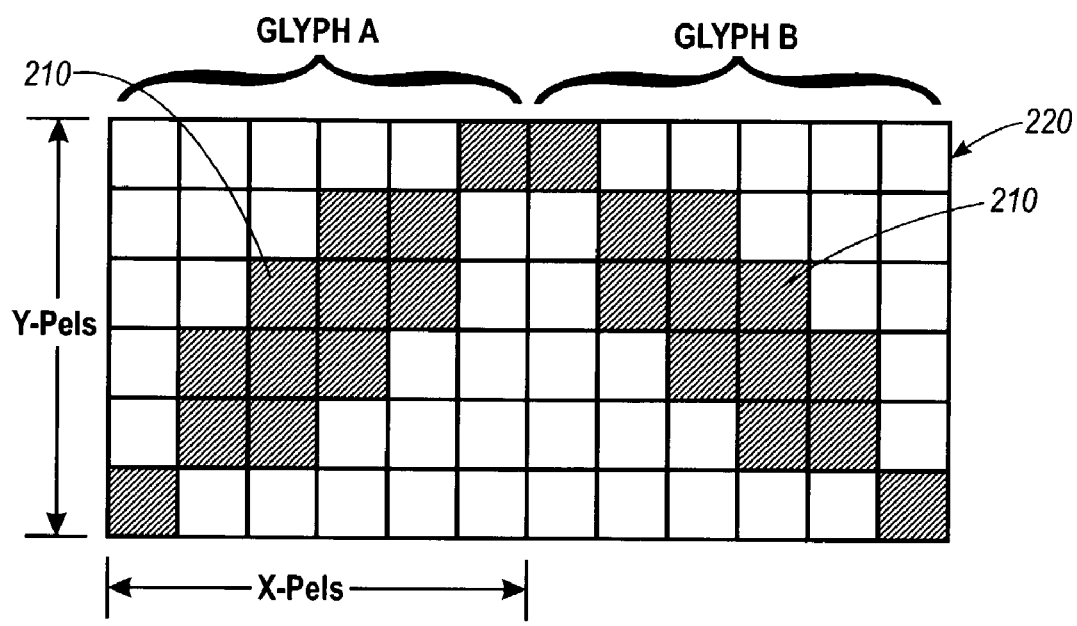
FIG. 2 is a coding diagram for illustrating the bit encoding of binary data in a rotationally invariant glyph shape code.

More particularly, the digital data that is applied on the encoder 114 is encoded in the shapes of the glyphs which the encoder 114 causes the printer 120 to print on the recording medium. These glyphs form a self-clocking glyph code because the code that is printed on the recording medium has a separate glyph for each of the encoded data values. In practice, as shown in FIG. 2, each of the printed glyphs 210 is defined by the pixel pattern that is printed within a generally rectangular, two dimensional, array 220 of pixel positions (referred to hereinafter as a "glyph cell" or as a "data cell"). These glyph defining data cells 220 typically are tiled onto the recording medium in accordance with a predetermined spatial formatting rule which causes the glyph encodings 210 for successive data values to be spatially distributed in accordance with a predefined template or patter. For instance, the data cell 220 containing the glyph encodings 210 for successive data values suitably are printed on the recording medium in accordance with a regular and repeating logical data block formatting rule, such that the printed data cells are spatially organized in a two dimensional array of logical blocks of predetermined size, such as a 16 cell×16 cell logical block format.

Glyph shape encoding clearly permits many different implementations, some of which are suitable for the encoding of single bit digital values and other of which are suitable for the encoding of multi-bit values. For example, single bit values ("1" and "0") conveniently are encoded by printing elongated, multi-pixel glyphs, each of which is composed of a predetermined number of adjacent "ON" (say, black) pixels which align along an axis that is inclined at an angle of about +45° or −45° from the transverse axis of the recording medium depending on whether the data value encoded therein is a "1" or a "0". Such glyphs are examples of so-called "rotationally variant" glyphs because they can be mapped onto each other merely by rotational operations. They also are examples of glyphs, which are readily discriminable, even in the presence of significant distortion and image degradation, because they do not tend to degrade into a common shape.

Figure 3:
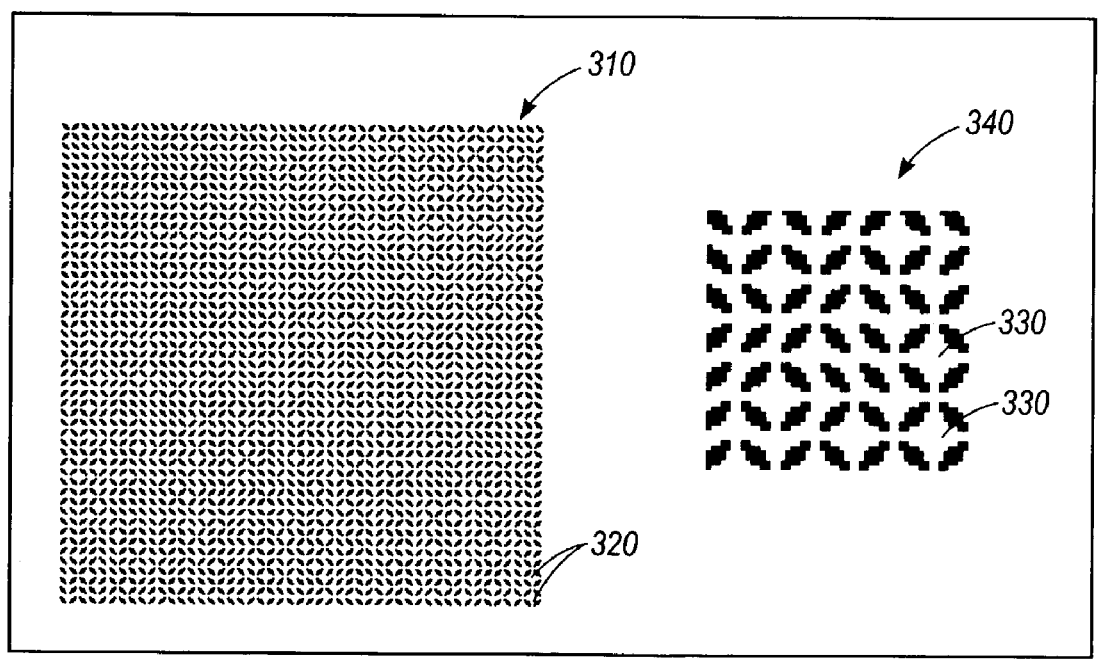
FIG. 3 illustrates a portion of a DataGlyph® image having artifacts.

An important advantage of selecting the glyphs so that they all have the same number of "ON" pixels is that the printed glyph code will have a generally uniform texture, which will take the form of a gray scale appearance when higher density glyphs are viewed by a casual observer. While the use of glyph blocks is generally visually non-intrusive, an artifact, a visual effect (usually considered a defect) introduced into a digital image that does not correspond to the image scanned, may appear if four neighboring cells form an empty diamond shape, as illustrated in FIG. 3. In sample glyph block pattern 310, instead of having a uniform appearance, numerous diamonds 320 formed by four strokes in the rendering result in an uneven image appearance, due to an uneven spatial frequency. In glyph block pattern 340, the lower right corner of glyph block pattern 310 has been enlarged to show diamonds 330 more clearly.

Figure 4:
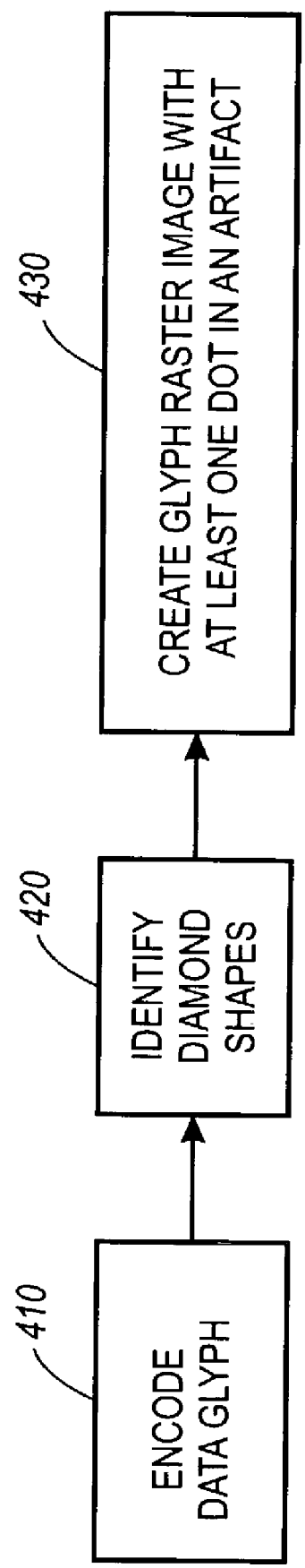
FIG. 4 is a high-level functional block diagram of one embodiment of a method for reducing the obtrusiveness of glyph codes forming a diamond shape.
Figure 5:
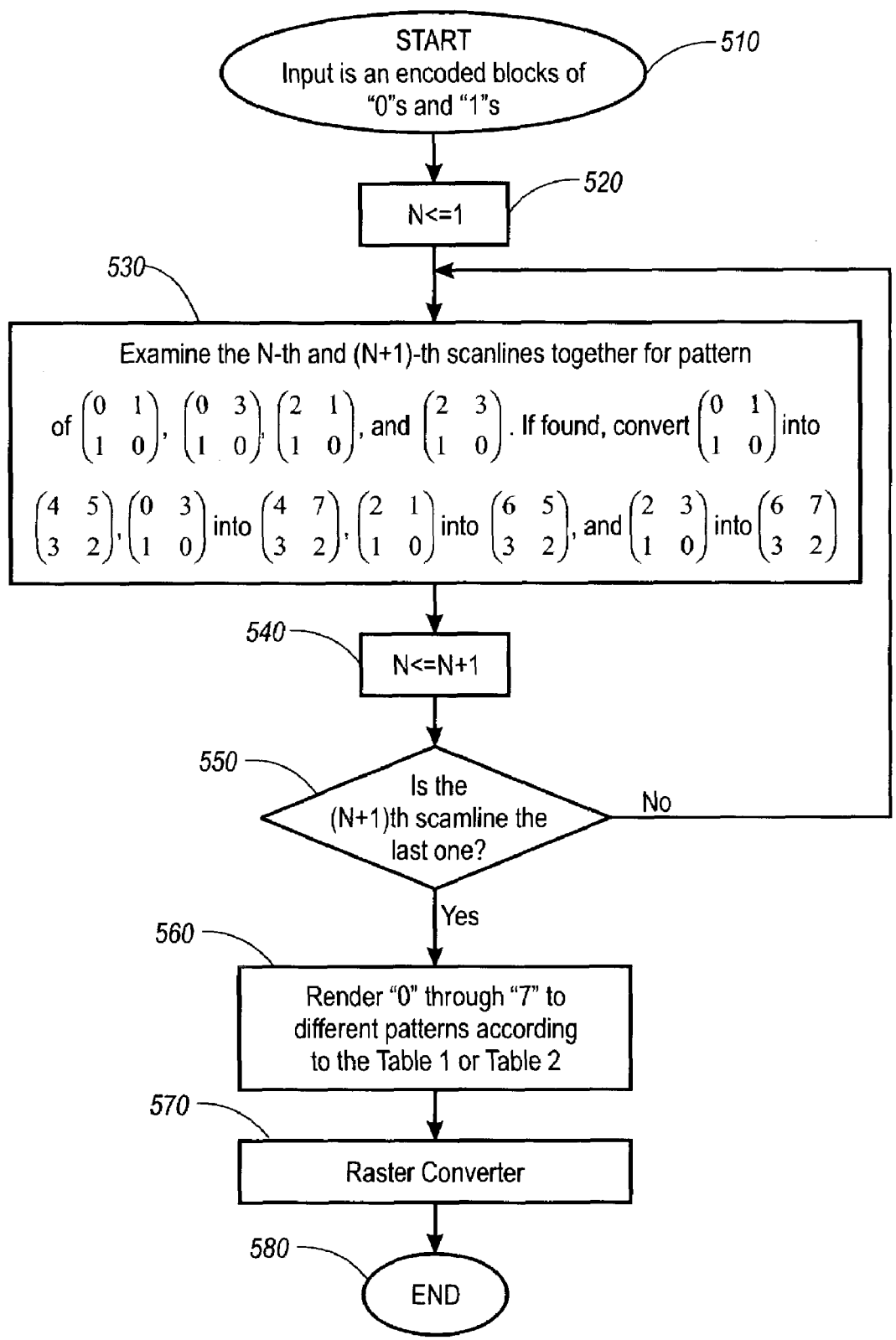
FIG. 5 is a flowchart of one embodiment of a method for reducing the obtrusiveness of glyph codes forming a diamond shape according to the embodiment of FIG. 4.
Figure 6:
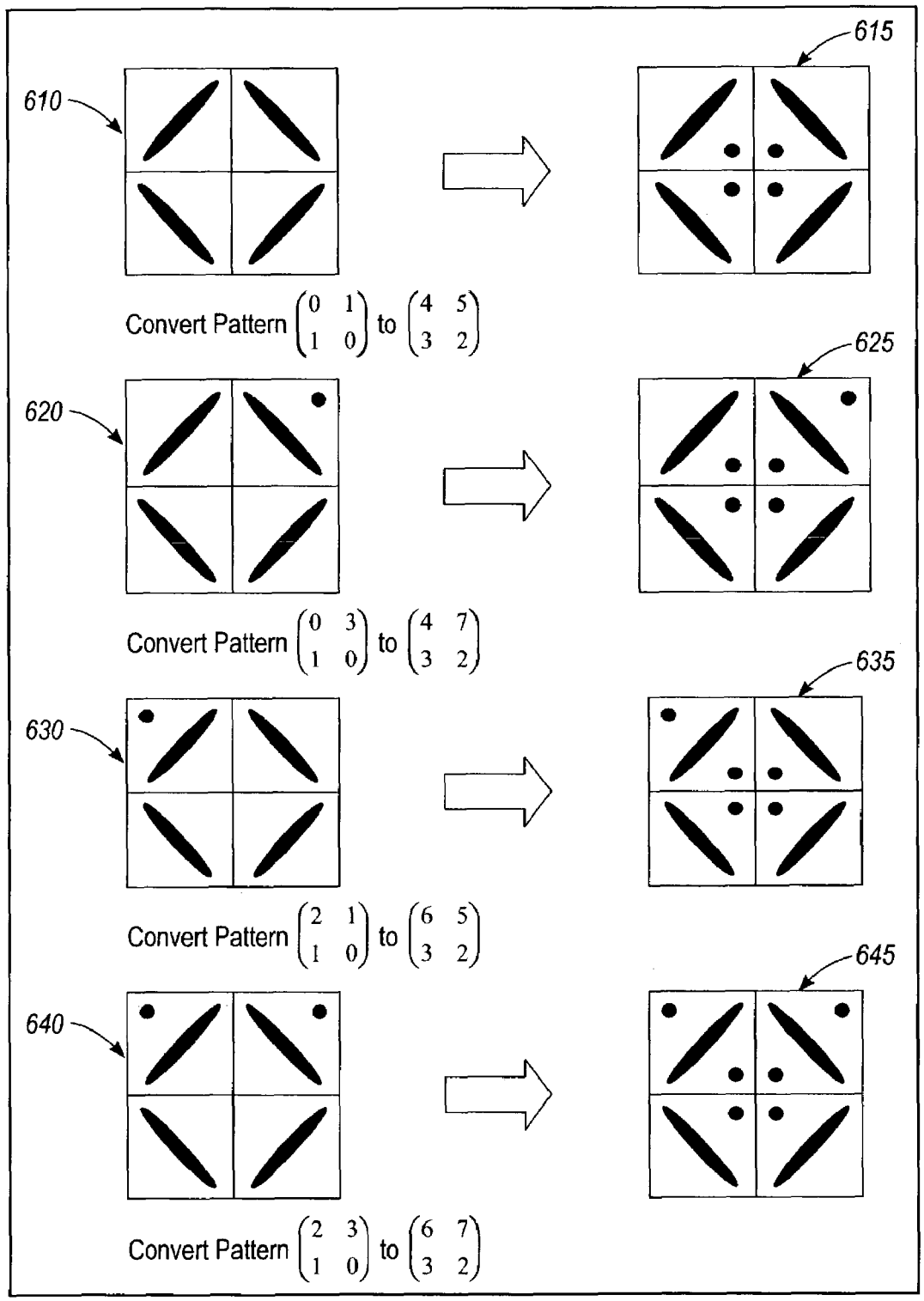
FIG. 6 illustrates the glyph code pattern embodiments according to the flowchart of FIG. 5.
Figure 7:
FIG. 7 illustrates sample embodiments of tables utilized as indicated in the flowchart of FIG. 5.
Figure 7:

As shown in FIG. 4, glyph shape encoding may be modified to reduce the obtrusiveness of glyph block patterns containing diamonds. To that end, data is glyph shape encoded at 410 and the encoded glyph shapes are checked by the system to identify the occurrence of diamond shapes at 420. The encoded data glyph shapes then are converted into a raster format at 430. In the conversion, the raster formatted glyph shapes are modified to include clustered dots within the diamond shapes at 430. The resulting image may then be printed on a suitable recording medium, such as plain paper, by a bitmap printer. It will be appreciated that, although it is desirable to do the raster conversion and dot placement simultaneously, dot placement may be performed after the raster conversion as a post processing step. Turning now to FIGS. 5 through 7, the method for reducing the obtrusiveness of artifacts in glyph images is presented in greater detail. At 510, information to be preserved in glyphs is encoded in blocks of "0"'s and "1"'s. At 520, N, which represents the scan line denominator, is initially assigned a value of "1". The $N^{th}$ and $(N+1)^{th}$ scanlines are examined for patterns that form diamonds within the total glyph image at 530, for example $$\begin{pmatrix} 0 & 1 \\ 1 & 0 \end{pmatrix}, \begin{pmatrix} 0 & 3 \\ 1 & 0 \end{pmatrix}, \begin{pmatrix} 2 & 1 \\ 1 & 0 \end{pmatrix}, \text{ and } \begin{pmatrix} 2 & 3 \\ 1 & 0 \end{pmatrix},$$

which are illustrated in FIG. 6 at 610, 620, 630, and 640, respectively. When such patterns are identified, they are converted as follows:

$$\begin{pmatrix} 0 & 1 \\ 1 & 0 \end{pmatrix} \text{ is converted into } \begin{pmatrix} 4 & 5 \\ 3 & 2 \end{pmatrix},$$

$$\begin{pmatrix} 0 & 3 \\ 1 & 0 \end{pmatrix} \text{ is converted into } \begin{pmatrix} 4 & 7 \\ 3 & 2 \end{pmatrix},$$

$$\begin{pmatrix} 2 & 1 \\ 1 & 0 \end{pmatrix} \text{ is converted into } \begin{pmatrix} 6 & 5 \\ 3 & 2 \end{pmatrix}, \text{ and}$$

$$\begin{pmatrix} 2 & 3 \\ 1 & 0 \end{pmatrix} \text{ is converted into } \begin{pmatrix} 6 & 7 \\ 3 & 2 \end{pmatrix},$$

which conversion is illustrated in FIG. 6 at 615, 625, 635, and 645, respectively. The scan line denominator is then incremented to N=N+1 at 540 in FIG. 5. The processor determines if the $(N+1)^{th}$ scan line is the final scan line at 550. If the $(N+1)^{th}$ scan line is not the last one, the processor returns to repeat step 530 until the final scan line has been evaluated. Although for the purposes herein, the diamond artifact is identified through a top-down, dual scan-line approach, it will be appreciated by those skilled in the art that numerous other approaches may be beneficially employed. The processor then renders "0" through "7" in varying patterns according to the patterns entered on either Table 1 or Table 2 shown in FIG. 7. As may be appreciated from Tables 1 and 2, various embodiments of dots in glyph shapes are possible. Table 1 illustrates glyph patterns for a first embodiment, which result in dispersed dots placed within the diamond configurations, as shown in FIG. 6 at 615, 625, 635, and 645. Table 2 illustrates glyph patterns for a second embodiment, which result in clustered dots placed within the diamond configurations, as discussed hereinbelow with reference to FIG. 8. As will be appreciated, alternate glyph patterns could also be beneficially employed to the same purpose, all of which are contemplated by the spirit and scope of the claims herein. For example, fewer dots could be placed in the cells of the artifact; even a single dot in one of the glyph cells would be sufficient for providing a more uniform spatial frequency in the image. A raster converter then creates an image at 570, which is transmitted to a printing device at 580.

Figure 8:
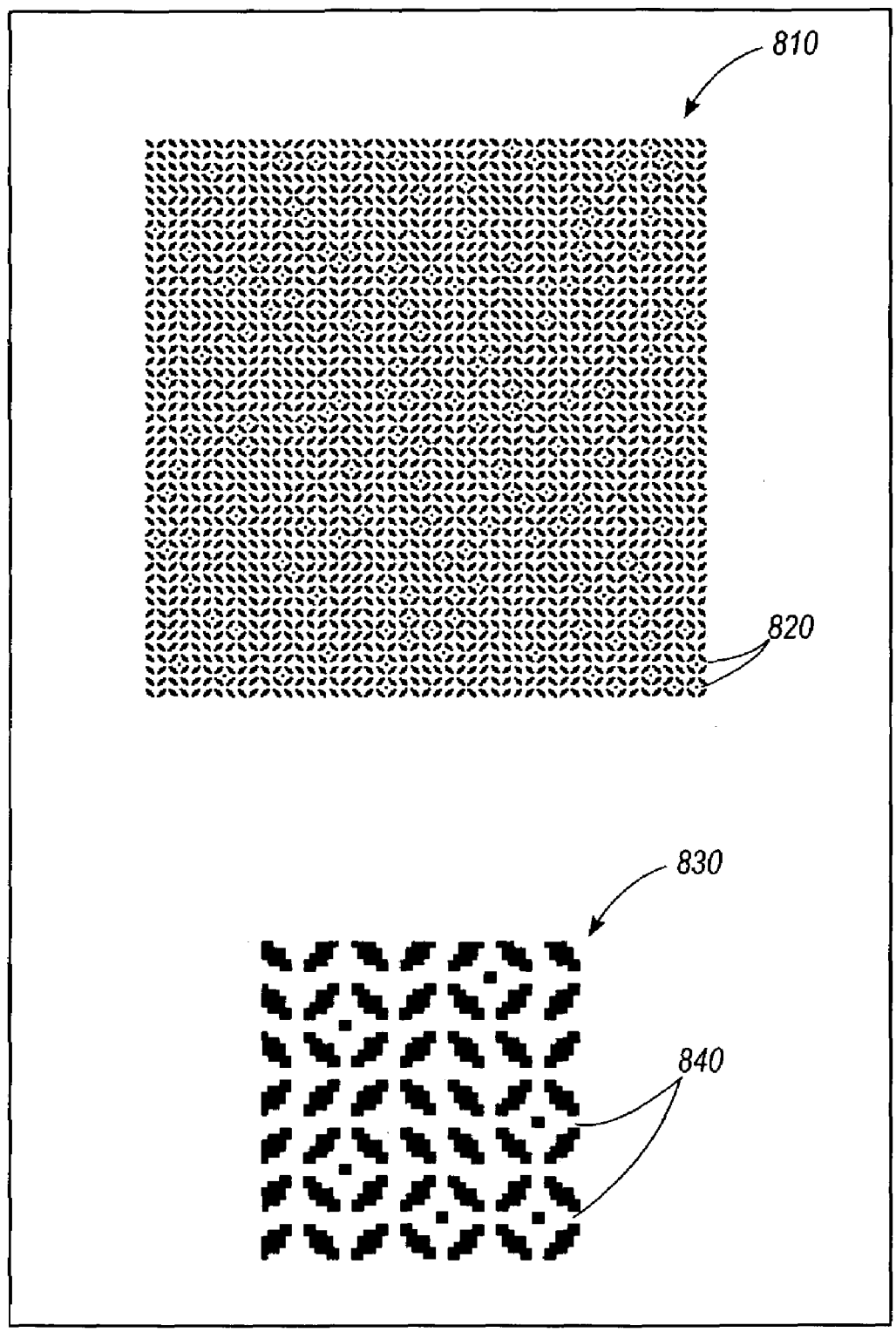
FIG. 8 illustrates the reduction of visibility of artifacts in a DataGlyph image in accordance with one embodiment of the subject invention.

Turning now to FIG. 8, the reduction in obtrusiveness of diamonds in a glyph image is shown with the embodiment of Table 2 from FIG. 7. In glyph block rendering 810, a cluster of pixels, in the form of a clustered dot, have been placed in each diamond 820 to bring the spatial frequency in the neighborhood to a similar range as the rest of the image. A portion of the glyph block rendering is enlarged at 830 such that clustered dots 840 can be seen more clearly. Although typically there would be at least four dots in the cluster, it will be appreciated that this number could vary. Placement of the pixels in a clustered dot provides a solution that is more stably reproduced by printing engines. Some print engines, depending on their operational speed, may skip single pixel dots.

Figure 9:
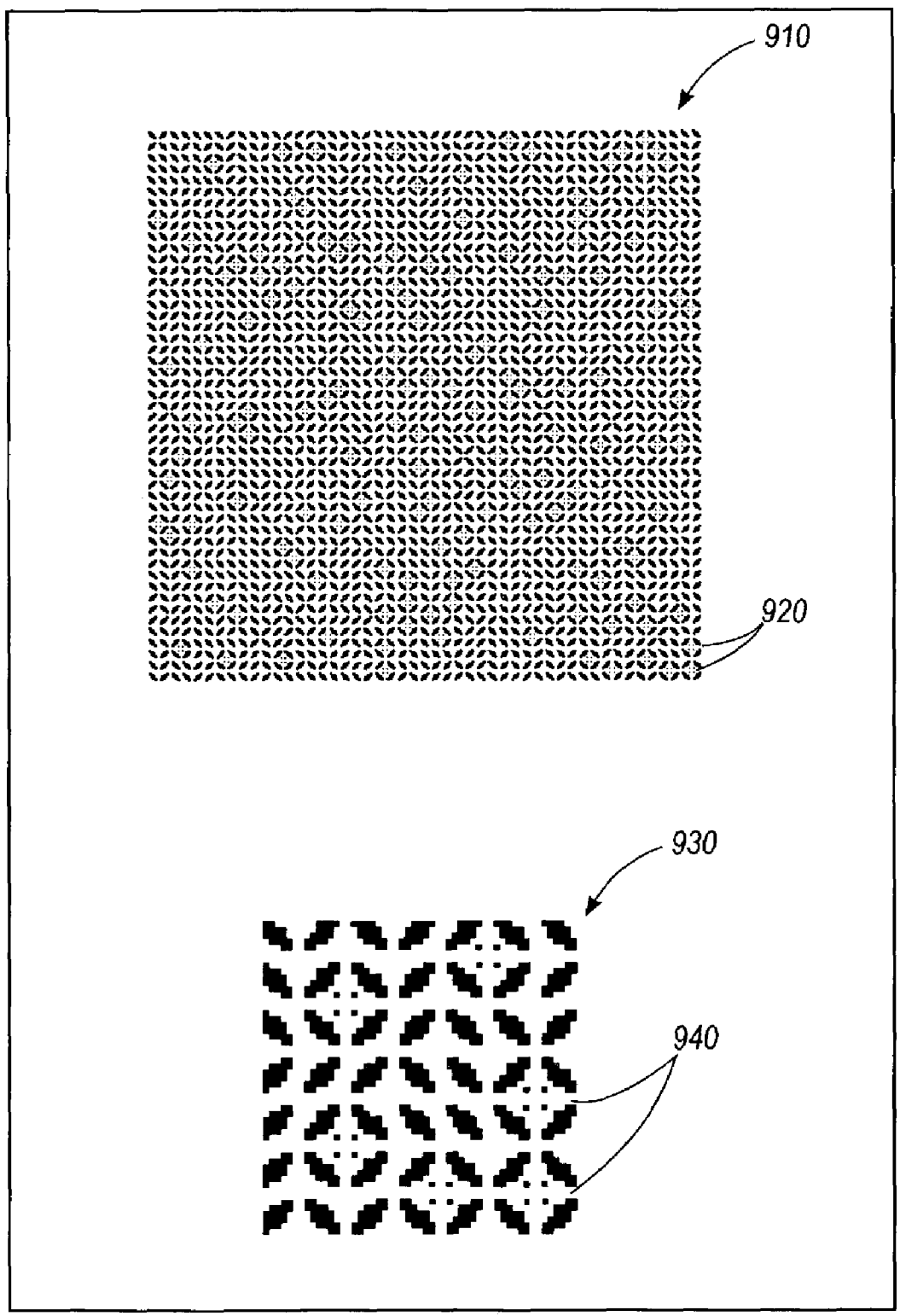
FIG. 9 illustrates the reduction of visibility of artifacts in a DataGlyph image according to another embodiment of the subject invention.

Although this embodiment satisfies print engine requirements, it does not provide for a gap, or "quiet zone" in which all the pixels are off, between two neighboring cells. One of the rationales for the "quiet zone" requirement is based on the observation that gaps between cells will make it easy for the decoder to detect the orientation of the dataglyph block and the frequency of the cells. This concern is met by an alternate embodiment of the method taught herein as illustrated in FIG. 9. In this embodiment, whose glyph patterns are illustrated in Table 1 of FIG. 7, glyph block image 910 includes dispersed dots in each four-stroke diamond 920. This may be seen more clearly in enlargement 930, in which the positions of dots 940 are carefully arranged such that they are close to the center of the four stroke diamond but still leave a gap, or "quiet zone" between neighboring cells. Although four dots 940, one in each of the neighboring cells that form the diamond, are illustrated, it will be appreciated that the number of dots could vary. Each dot 940 may be a single pixel or a cluster of pixels. While this embodiment meets the requirement of a "quiet zone" and is potentially easier to decode, if a dispersed dot consists of a single pixel, it may not be printed by some print engines.

As is known in the art, glyphs may also be embedded in halftone images. Halftoning is a well known and widely utilized technique for imparting a grayscale appearance to dual tone renderings of variably shaded monochromatic images (e.g., black and white images), and to dual tone color separations of variably shaded polychromatic images. It originated as an optical analog process for imparting a grayscale appearance to dual tone reproductions of continuous tone monochromatic images, but it since has been extended to provide digital halftoning processes that can be utilized by digital document processors for imparting a grayscale appearance to dual tone representation of variably shaded, scanned-in digitized images and to dual tone representations of variably shaded, computer generated synthetic images. These digitally defined images may be monochromatic or polychromatic, so it is to be understood that digital halftoning can be applied for imparting a grayscale appearance to printed and displayed renderings of monochromatic and polychromatic images. Polychromatic images typically are halftoned by halftoning each of the color separations that are provided for rendering such images.

Glyph states can be generalized to distinguishable halftone cell patterns of equal gray or color value, especially rotations of patterns without circular symmetry as taught in Tow (cited hereinabove). Such an image may also be referred to as a GlyphTone image. The use of glyph blocks to render halftone images is generally visually non-intrusive, but an artifact, a visual effect (usually considered a defect) introduced into a digital image that does not correspond to the image scanned, may appear if four neighboring cells form an empty diamond shape. In such a grayscale image, instead of having a uniform appearance, numerous diamonds formed by four strokes in the rendering result in an uneven image appearance, due to an uneven spatial frequency.

Figure 10:
FIG. 10 illustrates a typical gray scale image.

To illustrate this effect in a gray scale image, FIG. 10 shows a standard gray scale pictorial halftone 1000. A halftone image is one in which combinations of dots are used to create an impression of grays or colors by grouping and density. For example, the eye will see shades of gray in black dots on a white background. Where the dots are large, dense and possibly overlapping, the eye sees dark gray or black; where the dots are small and sparse, the eye sees light gray or white. This image can be contrasted with the same pictorial halftone, rendered in glyph blocks in FIG. 11. At an appropriate viewing distance, the visual effect is pictorial, and the individual cells are imperceptible. However, in the closer view shown in FIG. 11, the artifacts formed by four-stroke diamonds in image 1100 are noticeable throughout the figure, but are particularly prominent at the model's right eye. This portion of image 1100 has been enlarged at 1120 to illustrate the formation of glyph block diamonds 1130 in the right eye region.

Figure 12:
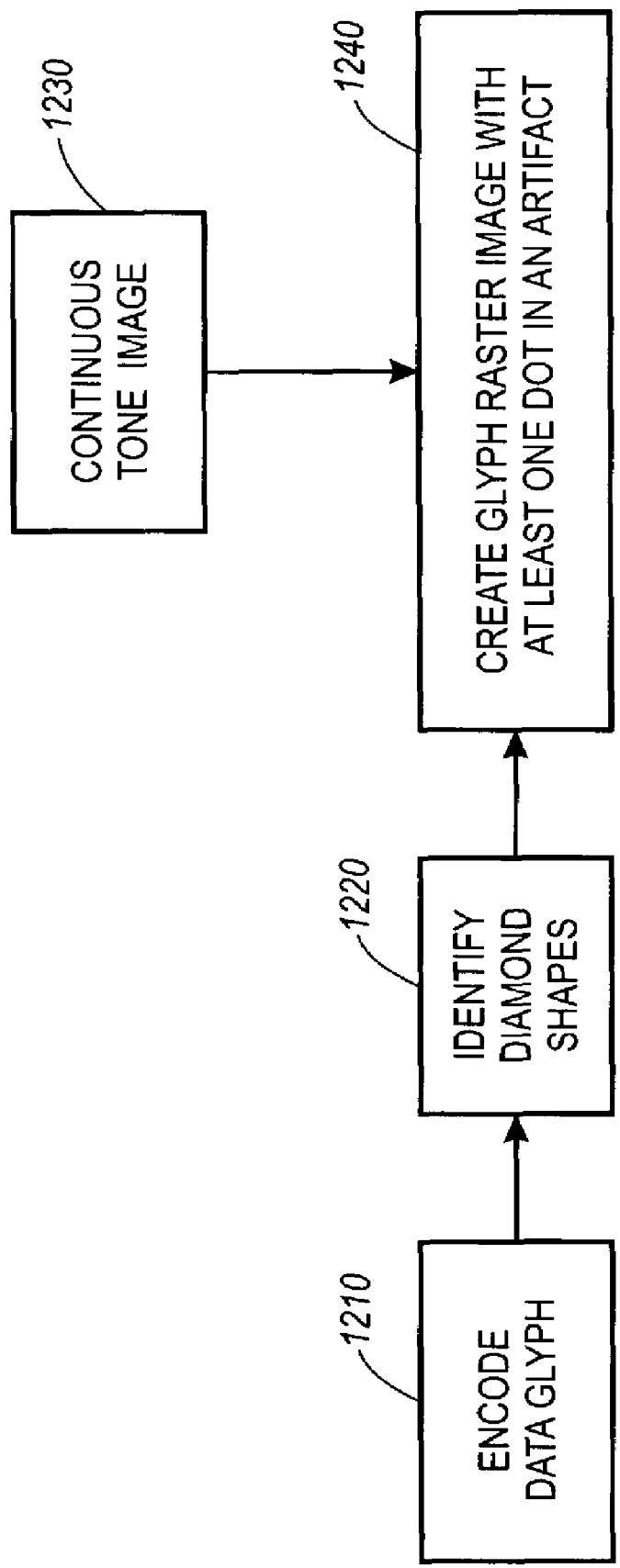
FIG. 12 is a high-level functional block diagram of another embodiment of a method for reducing the obtrusiveness of glyph codes forming a diamond shape in GlyphTone images.

As shown in FIG. 12, glyph shape encoding may be modified to reduce the obtrusiveness of glyph block patterns containing diamonds in halftone images. To that end, data is glyph shape encoded at 1210 and the encoded glyph shapes are checked by the system to identify the occurrence of diamond shapes at 1220. Gray scale or color image 1230 is provided to the processor with the encoded data glyph shapes and is converted into a raster format and glyph shapes are modified to include clustered dots within the diamond shapes at 1240. It will be appreciated that, although it is desirable to do the raster conversion and dot placement simultaneously, dot placement may be performed after the raster conversion as a post processing step. The resulting image may then be printed on a suitable recording medium, such as plain paper, by a bitmap printer.

Figure 13:
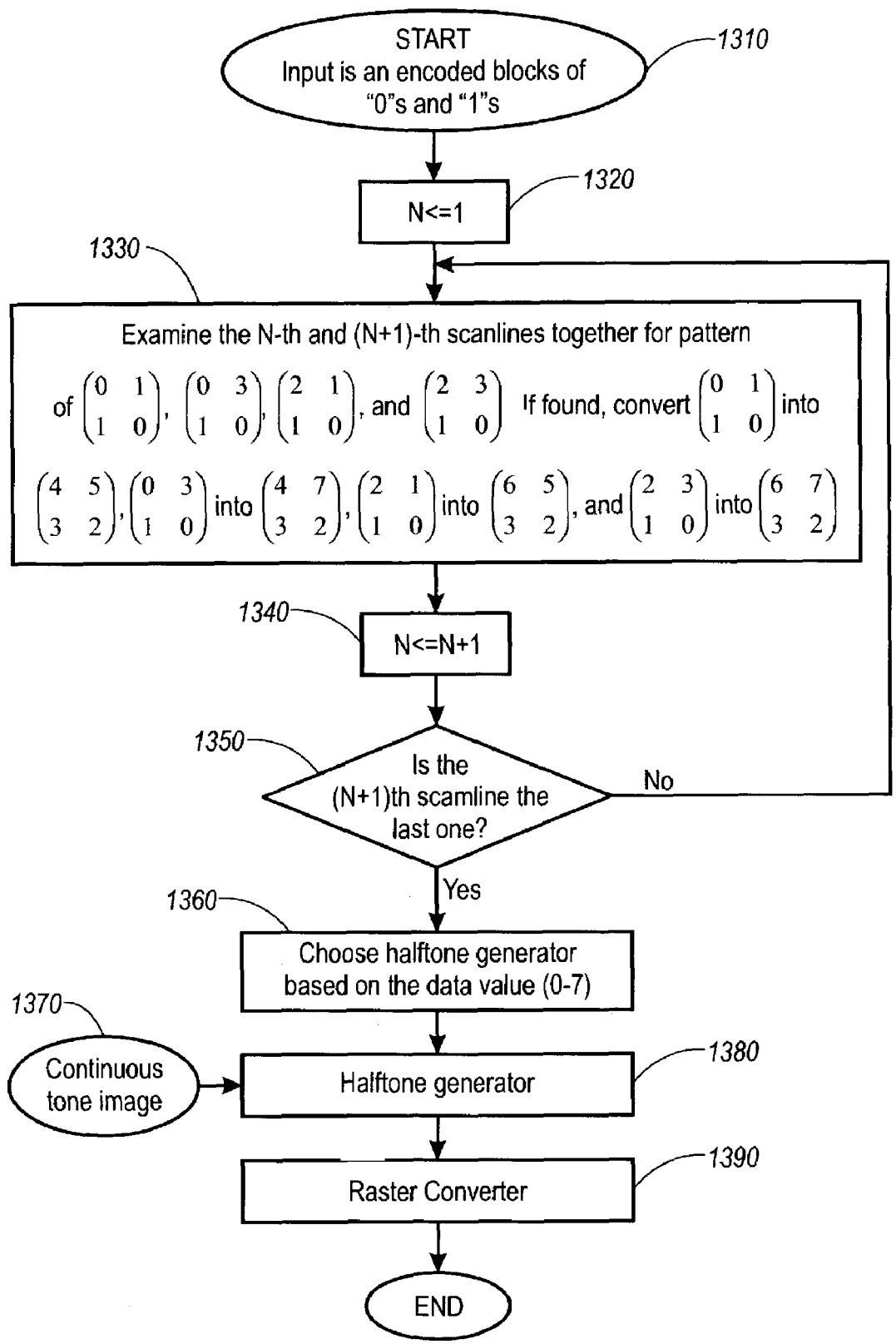
FIG. 13 is a flowchart of the method for reducing the obtrusiveness of glyph codes forming a diamond shape according to the embodiment of FIG. 12.

Turning now to FIG. 13, the method for reducing the obtrusiveness of artifacts in halftone glyph images is presented in greater detail. At 1310, information to be preserved in glyphs is encoded in blocks of "0"'s and "1"'s. At 1320, N, which represents the scan line denominator, is initially assigned a value of "1". The $N^{th}$ and $(N+1)^{th}$ scanlines are examined for patterns that form diamonds within the total glyph image at 1330, for example $$\begin{pmatrix} 0 & 1 \\ 1 & 0 \end{pmatrix}, \begin{pmatrix} 0 & 3 \\ 1 & 0 \end{pmatrix}, \begin{pmatrix} 2 & 1 \\ 1 & 0 \end{pmatrix}, \text{ and } \begin{pmatrix} 2 & 3 \\ 1 & 0 \end{pmatrix},$$

which are illustrated in FIG. 6 at 610, 620, 630, and 640, respectively. When such patterns are identified, they are converted as follows:

$$\begin{pmatrix} 0 & 1 \\ 1 & 0 \end{pmatrix} \text{ is converted into } \begin{pmatrix} 4 & 5 \\ 3 & 2 \end{pmatrix},$$

$$\begin{pmatrix} 0 & 3 \\ 1 & 0 \end{pmatrix} \text{ is converted into } \begin{pmatrix} 4 & 7 \\ 3 & 2 \end{pmatrix},$$

$$\begin{pmatrix} 2 & 1 \\ 1 & 0 \end{pmatrix} \text{ is converted into } \begin{pmatrix} 6 & 5 \\ 3 & 2 \end{pmatrix}, \text{ and}$$

-continued $$\begin{pmatrix} 2 & 3 \\ 1 & 0 \end{pmatrix} \text{ is converted into } \begin{pmatrix} 6 & 7 \\ 3 & 2 \end{pmatrix},$$

which conversion is illustrated in FIG. 6 at 615, 625, 635, and 645, respectively. The scan line denominator is then incremented to N=N+1 at 1340 in FIG. 13. The processor determines if the (N+1)$^{th}$ scan line is the final scan line at 1350. If the (N+1)$^{th}$ scan line is not the last one, the processor returns to repeat step 1330 until the final scan line has been evaluated. Although for the purposes herein, the diamond artifact is identified through a top-down, dual scan-line approach, it will be appreciated by those skilled in the art that numerous other approaches may be beneficially employed.

A halftone generator is selected for each glyph cell based on the data value of 0-7 at 1360. The chosen threshold arrays of N×N are tiled over the input gray scale or color image, with each threshold array covering an N×N area of the input image. A pixel is turned on in the output raster if and only if $$P \cdot N^2 \geq T(i,j),$$

Where T(i,j) is the value in the threshold array entry of the i-th row and the j-th column, and P is the intensity value of the pixel that corresponds to the threshold array entry, normalized to an interval between 0.0 and 1.0. The processor then renders "0" through "7" in varying patterns according to the sample patterns illustrated in FIG. 14. At 1380 the halftone generators at each glyph cell receive gray scale or color image 1370 and converts the gray scale or color image to a halftone image. As will be appreciated, alternate glyph patterns could also be beneficially employed to the same purpose, all of which are contemplated by the spirit and scope of the claims herein. For example, fewer dots could be placed in the cells of the artifact; even a single dot in one of the glyph cells would be sufficient for providing a more uniform spatial frequency in the image. A raster converter then creates an image at 1390, which is transmitted to a printing device.

Figure 11:
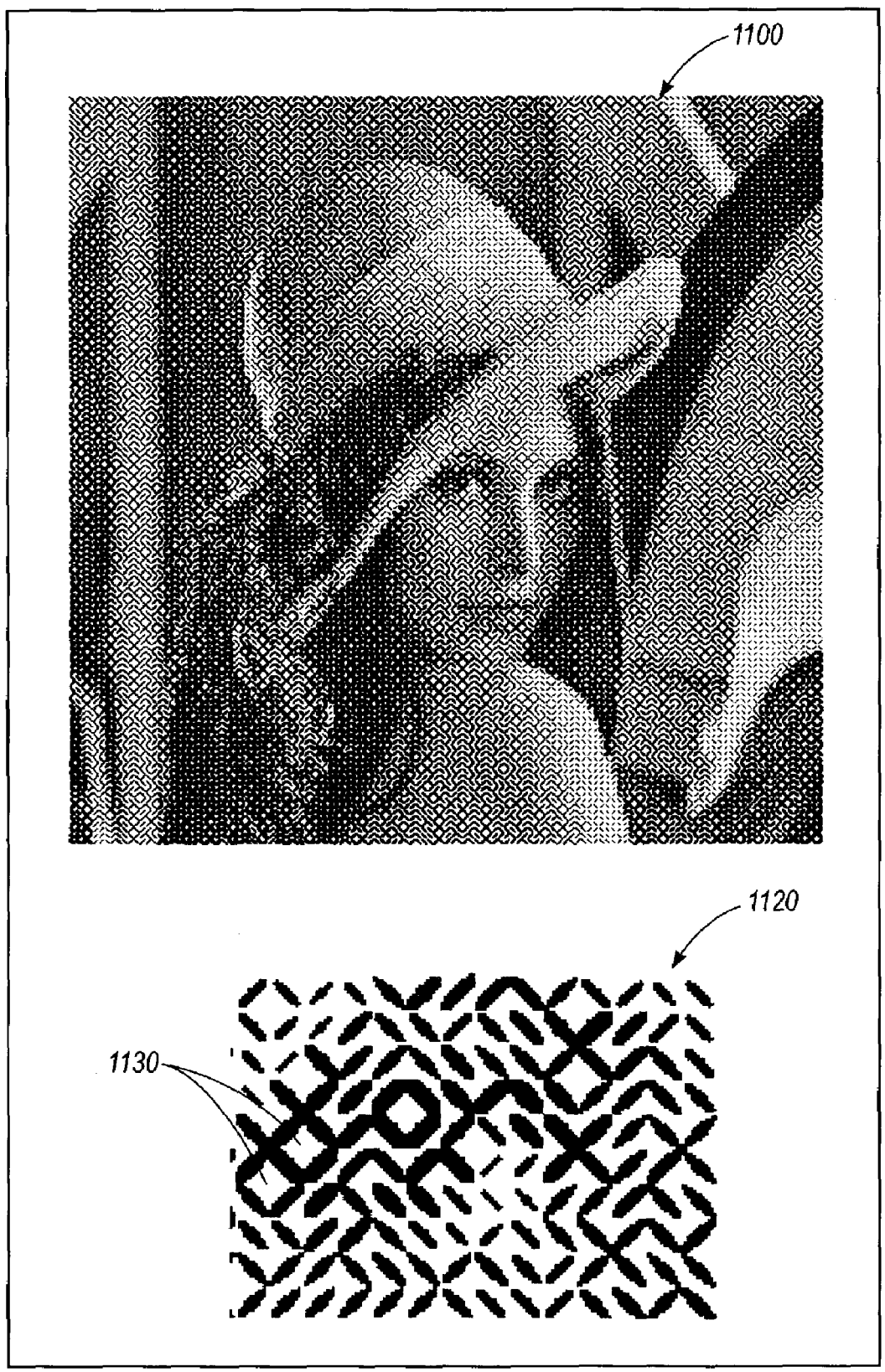
FIG. 11 shows the gray scale image of FIG. 10 rendered as a GlyphTone image.
Figure 15:
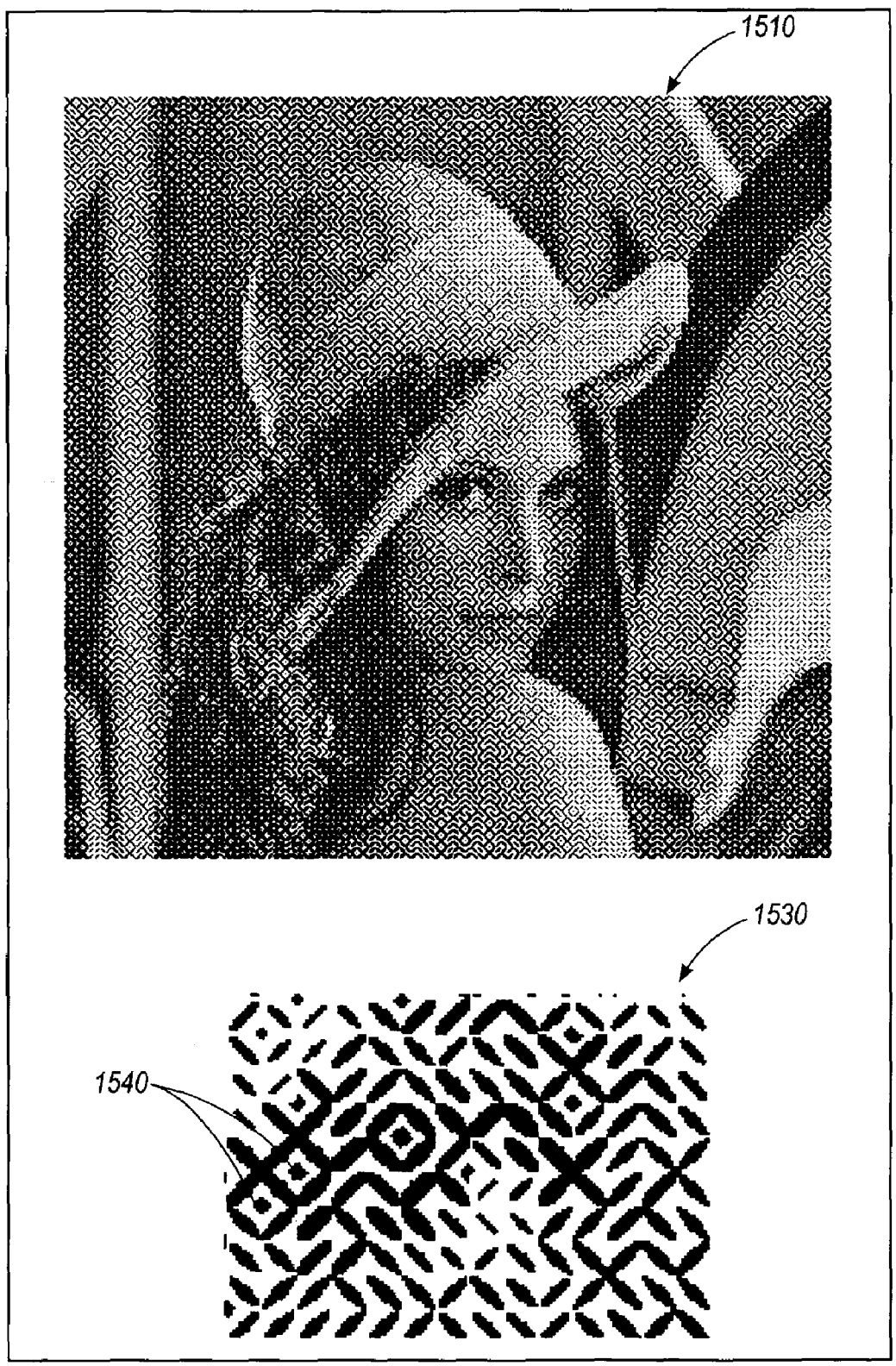
FIG. 15 shows the gray scale image of FIG. 10 rendered as a GlyphTone image in which artifact visibility is reduced according to the embodiment of FIG. 13.

FIG. 15 shows an example of the glyph block image according to FIG. 11 reproduced with glyph tone cells with clustered dots in each diamond. In image 1510 it can be observed that the artifact at the right eye has been reduced and the overall image appearance is more uniform. Image 1530 shows an enlargement of the right eye portion of image 1510, with clustered dots 1540.

While the present invention has been illustrated and described with reference to specific embodiments, further modification and improvements will occur to those skilled in the art. For example, a simple alternative scheme would replace the glyph cell patterns illustrated in FIG. 2 with the patterns 6 and 7 respectively, shown in Table 2 of FIG. 7. Because by using patterns 6 and 7 for FIG. 7 there is at least one dot at the corners off the diagonal axis of the elongated glyph shape, there will be at least one dot at the center of any artifact. This alternative eliminates the step of searching for the artiface. The disadvantage to this approach is that with two dots at the corners of each glyph cell, the "quiet zone" is violated, which may affect the decoding process. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed:

1. A method for reducing the obtrusiveness of artifacts appearing in a glyph shape code image space, comprising:
   encoding digital data values as a glyph shape code, said code being composed of glyphs having shapes that encode digital data values, such that each distinct data value that is encoded by said code is represented by the shape of a respective glyph, said glyphs being spatially distributed in a bitmap image space;
   analyzing said bitmap image space for determining the presence of artifacts within said bitmap image space; and
   generating a raster image of said bitmap image space, wherein not less than one dot is placed within not less than one of the artifacts.

2. The method according to claim 1, wherein encoding digital data values comprises encoding said digital data values as blocks of "0"s and "1"s.

3. The method according to claim 1, wherein analyzing said bitmap image space comprises examining successive scan lines within said bitmap image space to identify artifacts appearing therein.

4. The method according to claim 3, wherein artifacts comprise glyph shape patterns.

5. The method according to claim 4, wherein said glyph shape patterns comprise a plurality of glyphs configured to form a geometric shape.

6. The method according to claim 5, wherein said geometric shape comprises a diamond.

7. The method according to claim 5, wherein placing not less than one dot comprises replacing not less than one of said plurality of glyphs configured to form a geometric shape with not less than one replacement glyph configured to include a dot with said replacement glyph.

8. The method according to claim 5, wherein placing not less than one dot comprises replacing each of said plurality of glyphs configured to form a geometric shape with individual replacement glyphs configured to include a dot with each said individual replacement glyph.

9. The method according to claim 8, wherein said individual replacement glyphs are selected from a table.

10. The method according to claim 8, wherein said individual replacement glyphs comprise halftone generators.

11. The method according to claim 1, wherein placing not less than one dot comprises placing a plurality of dots tightly clustered in the region of the center of not less than one of the artifacts.

12. The method according to claim 1, wherein placing not less than one dot comprises placing a plurality of dots dispersed within the interior region of not less than one of the artifacts.

13. The method according to claim 1, wherein said glyph code image space appears within a halftone image.

14. The method according to claim 13, further comprising providing a gray scale image for the creation of a raster image of the image space.

15. The method according to claim 13, further comprising providing a color image for the creation of a raster image of the image space.

16. A system for reducing the obtrusiveness of artifacts appearing in a glyph shape code image space, comprising:
- a processor for executing control instructions and image editing and manipulation instructions comprising:
  - an encoder for encoding digital data values as a glyph shape code, said code being composed of glyphs having shapes that encode digital data values, such that each distinct data value that is encoded by said code is represented by the shape of a respective glyph, said glyphs being spatially distributed in a bitmap image space;
  - means for analyzing said bitmap image space for determining the presence of artifacts within said bitmap image space; and
  - means for manipulating said bitmap image space to create a bitmapped image file wherein not less than one dot is placed within not less than one of the artifacts;
- a main memory;
- a mass memory; and
- at least one printer for mapping the digital values of a bitmapped image file into the spatially corresponding pixels of the image it prints on a recording medium.

17. The system according to claim 16, wherein said processor further comprises a page description language driver for transferring descriptions of electronic document files selected for printing to said printer.

18. The system according to claim 16, wherein said printer further comprises a page description language decomposer for decomposing page description language descriptions to produce corresponding bitmapped image files.

19. The system according to claim 16, further comprising a user interface for enabling a user to interact with said processor.

20. The system according to claim 16, wherein said printer includes a user interface.

21. The system according to claim 16, further comprising an input device for providing a bitmap image.

22. A computer-readable storage medium encoded with computer program code, comprising:
- code for encoding digital data values as a glyph shape code, said code being composed of glyphs having shapes that encode digital data values, such that each distinct data value that is encoded by said code is represented by the shape of a respective glyph, said glyphs being spatially distributed in a bitmap image space;
- code for analyzing said bitmap image space for determining the presence of artifacts within said bitmap image space; and
- code for generating a raster image of said bitmap image space, wherein not less than one dot is placed within not less than one of the artifacts.

* * * * *